United States Patent Office 2,855,391
Patented Oct. 7, 1958

2,855,391

MANUFACTURE OF DRY ROSIN SIZE

Charles Robert Rothenanger, Sr., Valdosta, Ga., assignor to American Cyanamid Company, New York, N. Y., a corporation of Maine No Drawing. Application October 12, 1956
Serial No. 615,454

4 Claims. (Cl. 260—105)

The present invention relates to the manufacture of dry rosin size by a process wherein molten rosin is saponified with aqueous alkali metal carbonate solution and the liquid rosin size thus formed is dried on a hot surface to thin powdery flakes. The invention is particularly directed at increasing the efficiency of the drying step by degassing the liquid rosin size prior to drying.

Dry rosin size is currently manufactured by a process wherein a molten rosin and aqueous alkali metal carbonate solution are saponified to form liquid rosin size which is dried by contact with a hot surface such as a revolving steam-heated drum. The reaction may be performed in an open cook tank or in a pressure reactor, particular methods being employed in the latter event for removal of the carbon dioxide formed. The saponification generally does not go to completion in the reactor, only about 90%-95% of the rosin being saponified therein. The remainder of the rosin is caused to react during the few moments that the size is being dried and for this purpose the temperature of the hot surface is maintained quite high, temperatures of 150° C.–250° C. and even higher being advantageous.

Rosin is a pumpable liquid at 80° C. and reacts readily with soda ash at that temperature to form good quality liquid rosin size. Despite this, it is general practice to perform the saponification at a temperature as close to the boil as control of spattering and foaming will permit. Attempts to decrease the reaction temperature and thereby decrease the thermal requirements of this part of the process have been unsuccessful for the principal reason that lower temperatures have resulted in formation of liquid size which has been unduly difficult to dry. No reason for this difficulty has so far been publicly advanced.

Up to the present, it has generally been believed that substantially all of the carbon dioxide formed during the saponification volatilizes continuously as it is formed (cf. United States Patents Nos. 867,963 and 2,410,433) in the cook tank method, or flashes off when the pressure is released subsequent to autoclave saponifications, and it has not been supposed that liquid rosin size has a dissolved content of any other gas. It has consequently been believed that liquid rosin size contains at most a negligible amount of gaseous material including carbon dioxide.

The discovery has now been made that liquid rosin size prepared at temperatures below the boil contains a significant amount of dissolved gaseous material. I have found that when liquid size prepared as aforesaid is passed over a heated drying surface in the range of 150–250° C. or higher, the dissolved gas is converted to the form of small uniformly distributed bubbles and that these bubbles act as thermal insulation decreasing the rate at which heat from the hot surface penetrates the size, thereby retarding the drying rate and decreasing the apparent efficiency of the dryer.

The discovery has still further been made at the rate at which the size dries in such manner can be very substantially increased by removing dissolved gas prior to contact of the size with the hot drying surface.

We have further found that the foregoing discovery permits saponification of the rosin to be effected at a substantially lower temperature than that which has heretofore been customarily employed. We have found that the heretofore-noted difficulties in drying such rosin size can be substantially overcome by removing dissolved gas therefrom as aforesaid.

From the foregoing it will be seen that the present invention constitutes an improvement in the manufacture of dry rosin size from molten rosin and aqueous alkali metal carbonate solution by a process wherein the rosin and the carbonate solution are reacted to form the liquid rosin size and wherein the liquid size is dried by contact with a heated revolving drum or other hot surface. The chief improvement on which the invention is based resides in increasing the thermal conductivity of the size at drying temperatures in the range of 150° C.–250° C. by prior removal of dissolved gas therefrom.

The present invention has permitted a decrease of as much as 15° C. in the temperature at which the saponification can be performed and has increased the apparent efficiency of the drum dryer by as much as 50%. An unexpected benefit which resulted from the degassing treatment was an increase in the bulk density of the dry size of as much as 20%, which the permitted a corresponding economy in shipping containers.

The identity of the gas material removed from the liquid rosin size during the degassing treatment referred to above has not been ascertained. Theory indicates that the gases most probably removed are air (introduced with the soda ash solution) and carbon dioxide (formed by decomposition of the soda ash). Theory further indicates that carbon dioxide is the predominant gas. Since all gases are substantially equivalent from the point of view of their tendency to form bubbles having thermal insulating properties, the composition of the gaseous material removed is not a primary feature of the invention.

The weight of gas removed by the present invention is so small that it has not been possible to determine it analytically in industrial plant laboratories. As an aid in understanding the invention, however, it is pointed out that the total weight of carbon dioxide formed during saponification where a neutral size is produced is only about 4.6% of the weight of the liquid size or 7% of the weight of the size solids therein, and that nearly all of the carbon dioxide volatilizes as it is formed during the saponification. Any air present is probably in much the smaller amount. The amount of carbon dioxide, air, etc. that remains is therefore very small and evidently only just enough to give the film of liquid size as it dries on the hot surface a slight foaminess during the instant it passes from the liquid to the solid state. The precise amount of gas present in the liquid size and the proportion removed prior to drying are thus not primary features of the invention.

The step of removing dissolved gas may be performed by any convenient method, but necessarily is performed after the saponification of the rosin acids has gone to substantial completion in the cook tank or autoclave.

One suitable method is by vigorously boiling the size in a cook tank, 15–30 minutes of such boiling being generally sufficient for the purpose. Disengagement of the gas is aided by passage of steam through the size as it boils.

A second method is to flash off the gas by passing the size through a degassing chamber of a continuous vacuum type.

In practice we find it convenient to disengage the dissolved gas by flowing the size at about its boiling point over a surface in the form of a film and passing a stream of steam thereover, preferably in counter-current direction to the flow of the size. This method is rapid and cheap, and the steam may be recycled extensively as the actual amount of gas evolved is comparatively small.

The liquid size may be prepared by any convenient method. In general, a suitable rosin material is heated with aqueous alkali metal carbonate solution until the reaction is substantially complete, i. e., until the reaction of the rosin material becomes quite slow, 90%–95% saponification of the rosin being commercially regarded as substantial completion. Generally the carbonate solution is in slight stoichiometrical excess so as to form a completely neutralized dry size containing 1%–2% free carbonate. In other instances, however, the amount of carbonate may be decreased so as to form a size containing a substantial amount of free rosin.

The saponification temperature may be any temperature heretofore practiced. It is a feature of the invention, however, that the rosin may be saponified at any lower temperature which is above its flow point. The larger amount of dissolved gas which thereby becomes associated with the liquid rosin is removed by the subsequent degassing step.

Rosin materials that may be employed are gum rosin, wood rosin, tall oil rosin, disproportionated tall oil rosin, heat-treated wood rosin, or the fortified rosins prepared by reacting one of the foregoing rosins with a fortifying agent such as $\alpha,\beta$-dicarboxycyclic acid anhydrides such as maleic anhydride, itaconic, or citraconic acid, or with the newer fortifying agents represented by saligenin and substituted saligenins. The rosin-maleic anhydride adducts may contain a small amount of combined alcohol to decrease the flow point thereof as disclosed in co-pending application Serial No. 359,432 filed on June 13, 1953 by Drechsel et al. now U. S. Patent No. 2,791,578.

The alkali metal carbonates referred to are sodium and potassium carbonates and bicarbonates. The scope of the invention includes instances where a minor part, up to about one-half, of the carbonate is replaced by sodium or potassium hydroxide.

The invention will be further illustrated by the examples which follow. These examples represent specific embodiments and are not to be construed as limitations thereon.

*Example 1*

The following illustrates one preferred method for removing dissolved gas from liquid rosin size prior to the drum drying step. The example shows the effect of the gas removal on the efficiency of the drying step in comparison with a similar method when the step of gas removal is omitted.

Liquid rosin size is prepared by flowing 25,000 pounds of molten tall oil rosin at 150° C. into a 10,000-gallon open cook tank and simultaneously spraying thereover 16,342 pounds of aqueous commercial soda ash solution at 45° C. The soda ash solution is prepared by dissolving 4,000 pounds of soda ash in 12,342 pounds of water. Admission of the rosin and soda ash solution requires 1.75 hours. The reaction temperature of 80° C. is maintained by the use of steam admitted as necessary through spargers at the bottom of the tank. After a cook period of 3 hours the reaction is 90% complete based on the rosin reacted. The contents of the tank are rendered homogeneous by circulation, rosin being pumped from the bottom of the tank and being delivered by means of an outside pump and piping system to the top of the tank.

The liquid size is converted to dry size by delivering at 90° C. to a commercial drum dryer the drum of which is heated at 160° C. with steam at 90 lb./in.$^2$ pressure. The rate of rotation of the drum and the rate of supply of liquid size thereto are controlled so that the dry size product contains 0.70% moisture by weight. The output from the drum is 500 pounds of dry size per hour and the bulk density of the size is 16 lb./ft.$^3$ In the foregoing method, substantially no gas is removed from the size between the saponification and dying steps.

The effect of gas removal according to the present invention is shown by passing the stream of liquid size at a point just ahead of the dryer through a degasser composed of a vertical steel pipe 6" in diameter and 10' high containing ceramic packing so that the flow of the size through the tower is largely in the form of a film. The size is admitted at the top of the degasser at a temperature of 100° C. and flows downwardly against a slow current of steam admitted at the bottom which aids disengagement and removal of the dissolved carbon dioxide. Under these conditions the output of the drum dryer rises to 770 pounds per hour while producing size of 0.70% moisture and the density of the dry size is increased to 19 lb./ft.$^3$.

*Example 2*

The following illustrates the removal of gas from the liquid size while it is in the cook tank, i. e., while the size is in massive bulk form.

The procedure of Example 2 for the preparation of liquid size in the cook tank is repeated to the end of the three-hour cook period. The size is then heated to the boil by the admission of steam through the spargers at the bottom of the tank assisted by circulation of the size through an exterior auxiliary indirect heater. Admission of steam through the spargers is continued for about 15 minutes after the size reaches the boil, and a large proportion of the dissolved gases is removed.

The size is delivered to the drum dryer of Figure 1 at 90° C. and dried thereon as described. The yield of dry size of 0.70% moisture is 703 pounds per hour and the density of the dry size is 20.5 lb./ft.$^3$.

*Example 3*

The following illustrates the preparation of dry rosin size by a modification of the method of Example 2, using a preemulsifying system for the rosin and carbonate solution.

The pre-emulsifying system is set up consisting of two 3600 R. P. M. centrifugal pumps connected in series, a proportioning pump for feeding rosin and aqueous carbonate solution to the first pump, and a bleeder line for returning about 20% of the output of the second pump to the first pump. The remainder of the discharge of the second pump is delivered to the cook tank of Example 2.

Rosin at 150° C. and 24.5% aqueous soda ash solution at 50° C. are proportioned into the first centrifugal pump in the ratio of 1.53 volumes of rosin per volume of soda ash solution. After a few minutes of running, the rosin is emulsified in the first centrifugal pump by the action of the rosin soap returned from the second pump. The emulsified product is maintained at 80° C. in the cook tank until the reaction is 95% complete based on the rosin, after which the contents of the tank are heated to boiling by the use of steam passed through the spargers so as to drive off dissolved gas according to Example 2. The liquid size is then dried as described. The dry size obtained corresponds to that of Example 2.

I claim:

1. In the manufacture of dry rosin size from molten rosin and an aqueous alkali metal carbonate solution wherein a rosin is saponified with an aqueous alkali metal carbonate solution at a temperature below the boil to form liquid rosin size and said size is dried by contact with a hot surface, the improvement which consists in removing gas predominantly carbon dioxide from said liquid size prior to contact of said liquid size with said hot surface.

2. A process according to claim 1 wherein the alkali metal carbonate is sodium carbonate.

3. A process according to claim 1 wherein the gas is removed by flowing the size over a surface in the form of a film and passing a stream of steam thereover.

4. A process according to claim 1 wherein the gas is removed by passing steam through the size in massive bulk form while maintaining the size at about its boiling point.

References Cited in the file of this patent

UNITED STATES PATENTS

| | | |
|---|---|---|
| 424,991 | Mellen | Apr. 8, 1890 |
| 694,728 | Chappell | Mar. 4, 1902 |
| 2,027,166 | Harding et al. | Jan. 7, 1936 |
| 2,410,433 | Dreshfield | Nov. 5, 1946 |
| 2,411,824 | Farrell | Nov. 26, 1946 |